(12) United States Patent
Harty, Sr. et al.

(10) Patent No.: US 8,430,065 B2
(45) Date of Patent: Apr. 30, 2013

(54) BAIL ELEMENT FOR ANIMAL BAIL APPARATUS, AN ANIMAL BAIL APPARATUS COMPRISING A PLURALITY OF THE BAIL ELEMENTS, AND A METHOD FOR PROVIDING ANIMAL BAIL APPARATUS

(75) Inventors: Edmond Patrick Harty, Sr., Causeway (IE); Edmond Patrick Harty, Jr., Causeway (IE); John Harty, Causeway (IE)

(73) Assignee: Dewvale Limited, Tralee (IE)

( * ) Notice: Subject to any disclaimer, the term of this patent is extended or adjusted under 35 U.S.C. 154(b) by 525 days.

(21) Appl. No.: 12/530,605

(22) PCT Filed: Mar. 18, 2008

(86) PCT No.: PCT/IE2008/000022
§ 371 (c)(1),
(2), (4) Date: Oct. 26, 2009

(87) PCT Pub. No.: WO2008/111036
PCT Pub. Date: Sep. 18, 2008

(65) Prior Publication Data
US 2010/0116220 A1    May 13, 2010

(30) Foreign Application Priority Data
Mar. 15, 2007    (IE) .................................. S2007/0183

(51) Int. Cl.
*A01K 15/04*    (2006.01)
(52) U.S. Cl.
USPC .......................................... 119/729; 119/523

(58) Field of Classification Search ............... 119/712, 119/729, 731, 734, 738, 739, 743, 14.03, 119/516, 520, 521, 523, 524, 14.01, 14.02
See application file for complete search history.

(56) References Cited

U.S. PATENT DOCUMENTS 3,810,442 A * 5/1974 Jacobs et al. ............... 119/14.03
4,419,961 A * 12/1983 Vandenberg et al. ...... 119/14.03
(Continued)

FOREIGN PATENT DOCUMENTS
GB    2305102 A    4/1997
GB    2386815 A    10/2003
(Continued)

*Primary Examiner* — T. Nguyen
(74) *Attorney, Agent, or Firm* — Sughrue Mion, PLLC

(57) ABSTRACT

Bail apparatus (1) includes an overhead support member (3) which is suspended from an overhead support framework (14) by a linkage mechanism (11) from an operating member (12), so that the bail apparatus is operable in a lower operative state for separating animals and an upper release state for releasing the animals from a milking parlor (2). A plurality of bail elements (8) are mounted at spaced apart locations along the overhead support member (3), and each bail element includes a partition element (22) which extends substantially transversely of the overhead support member (3) at an angle α of approximately 78.5°. A coupling bracket (17) couples each bail element (8) to the overhead support member (3). A mounting plate member (18) extending downwardly from the coupling bracket (17) is bent along a bend axis (50) which defines first and second forward abutment faces (51,52) and first and second rearward abutment faces (55,56) for facilitating engagement of the corresponding partition element (22) in a selected one of first and second selectable orientations with the partition element (22) extending in respective different directions from the overhead support member (3) at the respective angles α, α' of 78.5°.

20 Claims, 5 Drawing Sheets

U.S. PATENT DOCUMENTS

Figure 3:
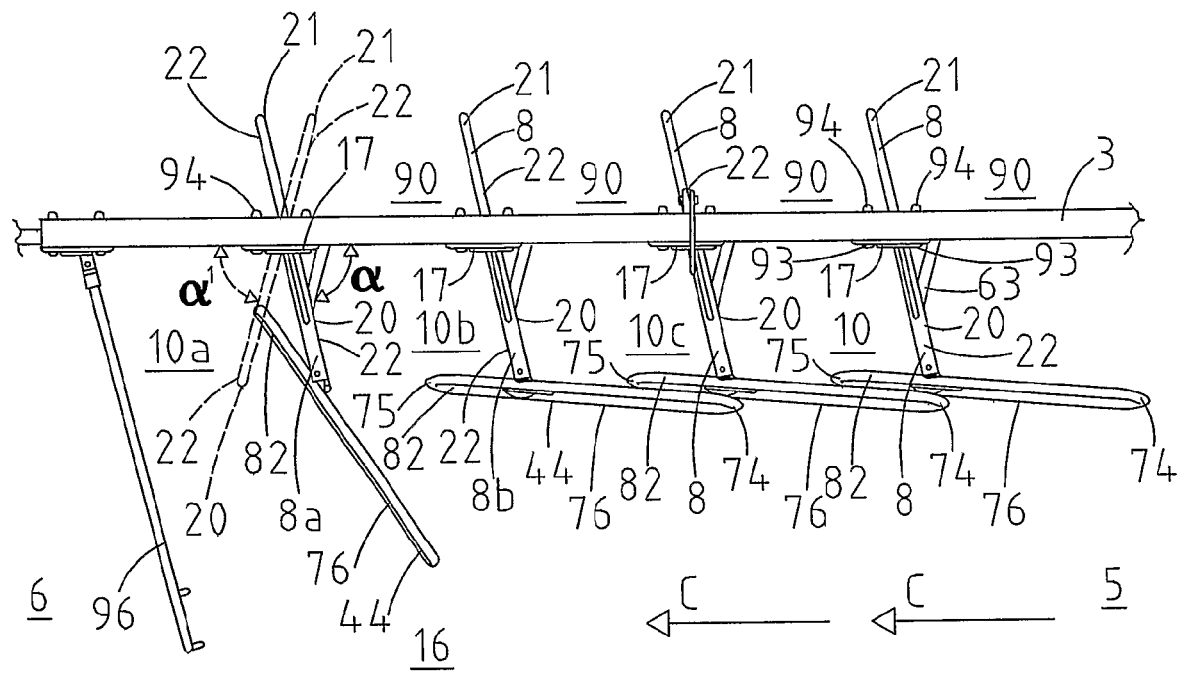

| | | | |
|---|---|---|---|
| 4,452,175 A * | 6/1984 | Thompson et al. | 119/14.03 |
| 4,854,268 A * | 8/1989 | Kipe | 119/14.03 |
| 4,977,856 A * | 12/1990 | Norwood | 119/14.03 |
| 5,000,119 A * | 3/1991 | Moreau et al. | 119/14.03 |
| 5,184,567 A * | 2/1993 | Peacock | 119/14.03 |
| 5,259,335 A | 11/1993 | Moreau | |
| 5,423,289 A * | 6/1995 | Larsen et al. | 119/520 |
| 5,469,808 A * | 11/1995 | Street et al. | 119/520 |
| 5,584,261 A * | 12/1996 | Hart et al. | 119/14.03 |
| 5,615,637 A * | 4/1997 | Nelson | 119/14.03 |
| 5,803,015 A * | 9/1998 | Rhodes et al. | 119/14.02 |
| 7,007,632 B1 * | 3/2006 | Vrieze et al. | 119/14.03 |

FOREIGN PATENT DOCUMENTS

| | | |
|---|---|---|
| IE | 030223 A1 | 10/2003 |
| SE | 175459 C | 10/1959 |

\* cited by examiner

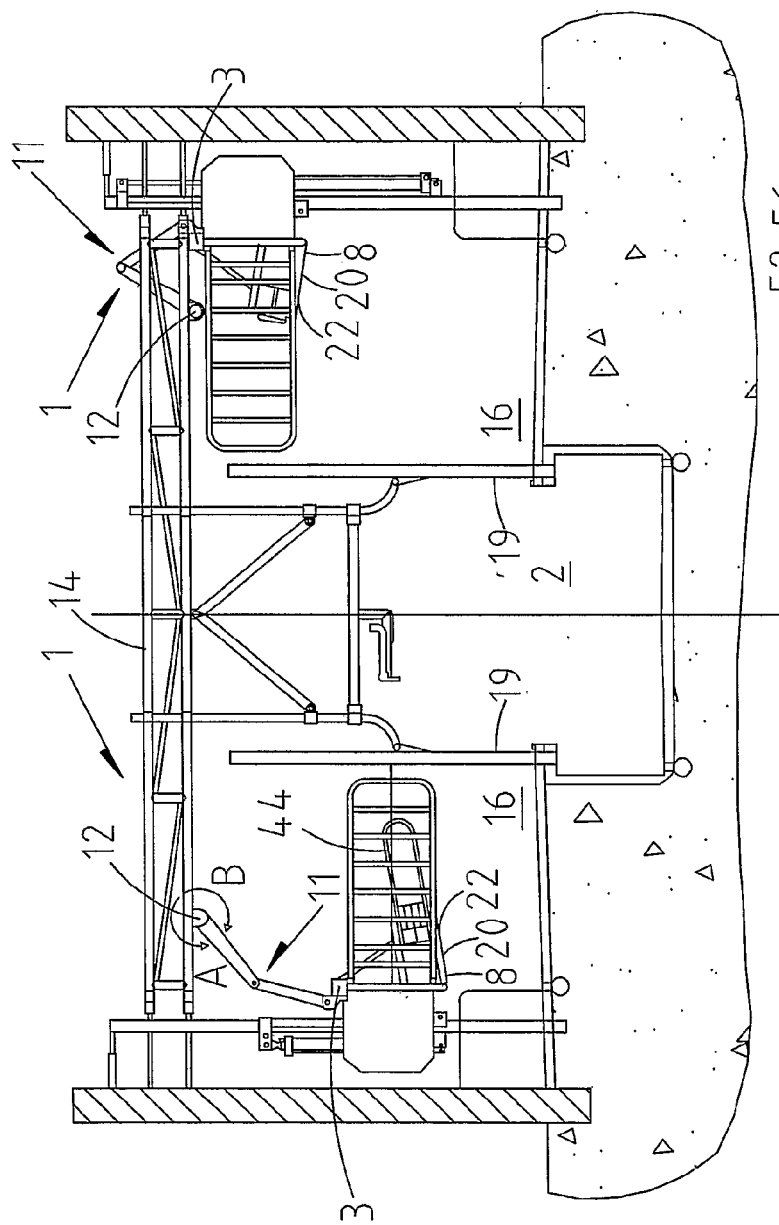
Fig. 1
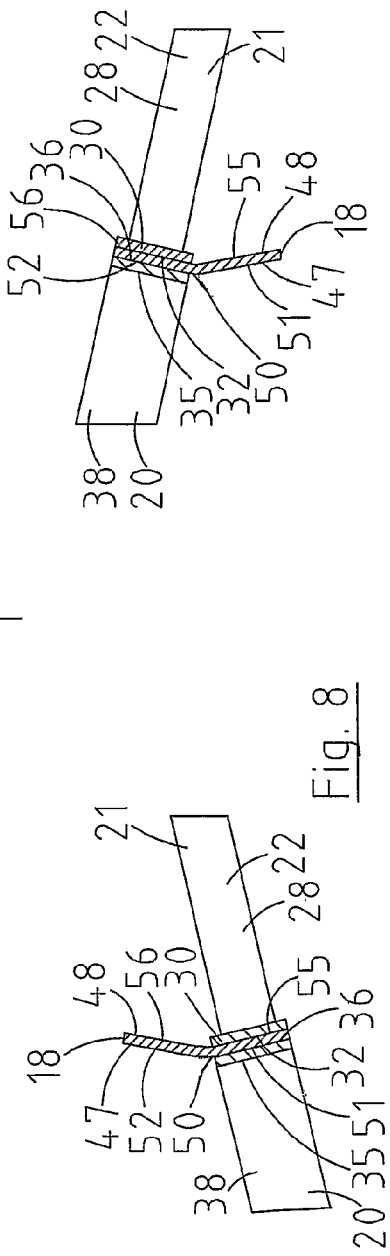
Fig. 8
Fig. 9

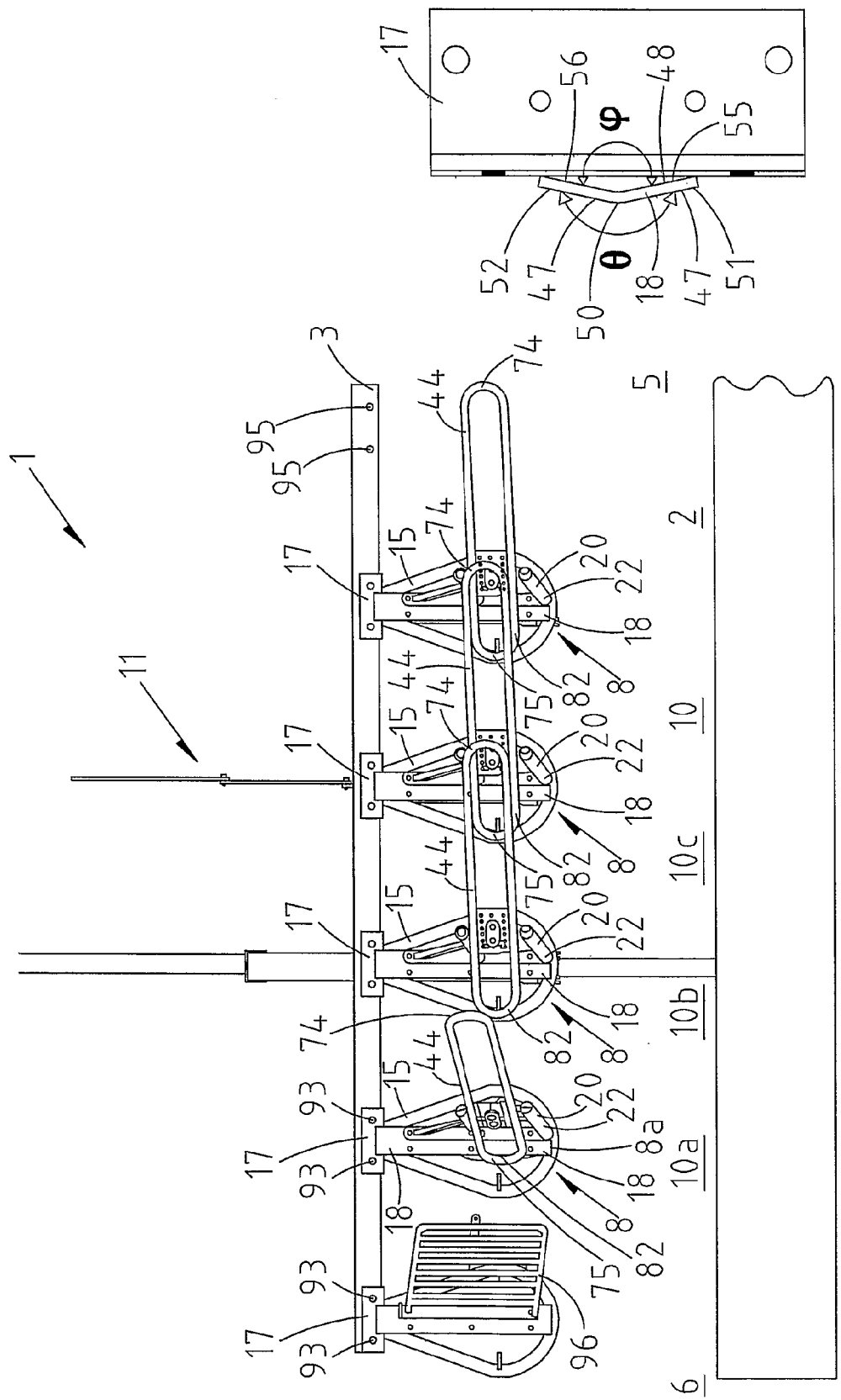

BAIL ELEMENT FOR ANIMAL BAIL APPARATUS, AN ANIMAL BAIL APPARATUS COMPRISING A PLURALITY OF THE BAIL ELEMENTS, AND A METHOD FOR PROVIDING ANIMAL BAIL APPARATUS

The present invention relates to a bail element for animal bail apparatus for separating animals, and the invention also relates to animal bail apparatus comprising a plurality of the bail elements, and the invention further relates to a method for providing animal bail apparatus.

Bail apparatus for separating animals is well known. Typically, such bail apparatus is used in animal houses where it is desired to separate animals, for example, for feeding or the like. In particular, bail apparatus is used in milking parlours for separating animals during milking and/or feeding.

In general, the bail apparatus comprises an elongated longitudinally extending overhead support member, which typically extends the length of the milking parlour from an upstream end to a downstream end. A plurality of bail elements depend downwardly at spaced apart intervals from the overhead support member. Adjacent bail elements define respective animal accommodating locations, each of which accommodates an animal. Each bail element comprises a transversely extending partition element, which extends transversely relative to the overhead support member from both sides thereof. The partition elements of the respective bail elements extending on one side of the overhead support member terminate in an end adjacent a passageway, which extends parallel to the overhead support member from the upstream end to the downstream end along which animals travel from the upstream end to sequentially access the animal accommodating locations defined by the bail elements from the downstream end to the upstream end. The partition element of each bail element carries a corresponding gate at the end thereof adjacent the passageway. The gate is operable between a closed state preventing access to the adjacent upstream animal accommodating location and an open state providing access to the adjacent upstream animal accommodating location. Additionally, in the open state the gate extends into the passageway and prevents an animal passing along the passageway in a downstream direction beyond the gate, thereby directing the animal into the adjacent upstream animal accommodating location for which the gate is provided to close.

The gates are mounted on the partition elements of the corresponding bail elements, so that as an animal enters an adjacent downstream animal accommodating location, the gate of the adjacent upstream animal accommodating location is operated into the open state. In this way the next following animal is directed into the adjacent upstream animal accommodating location. Thus, animals entering the bail apparatus from the upstream end thereof enter the animal accommodating locations sequentially from the downstream-most animal accommodating location to the upstream-most animal accommodating location.

A typical bail apparatus is described in Irish Patent Specification No. 84172 and in corresponding British Patent Specification No. 2,386,815. In the bail apparatus described in these two Patent specifications, the overhead support member is carried on a linkage mechanism, which in turn is carried on an elongated longitudinally extending operating member. The operating member is pivotal about its longitudinally extending central axis for operating the linkage mechanism for raising and lowering the overhead support member for in turn raising and lowering the bail elements between a lower operative state for separating the animals, and an upper release state for releasing the animals from the bail apparatus.

Such bail apparatus as disclosed in the Irish and British specifications is particularly suitable for use in milking parlours and other locations where it is desired to separate animals and in particular cattle. However, transportation of the bail apparatus tends to be relatively expensive due to the volume required by the bail apparatus. Additionally, different bail apparatus is required depending from which end the bail apparatus is to be entered by the animals. This, thus, results in relatively high stocking requirements.

There is therefore a need for bail apparatus which addresses these problems.

The present invention is directed towards providing such bail apparatus, and the invention is also directed towards providing a bail element for such bail apparatus, and the invention is also directed towards a method for providing such bail apparatus.

According to the invention there is provided a bail element for bail apparatus, the bail apparatus being of the type for separating animals and comprising an elongated longitudinally extending overhead support member, the bail element comprising a partition element, and a coupling means adapted for coupling the bail element to the overhead support member with the bail element depending downwardly therefrom and with the partition element extending substantially transversely relative to the overhead support member and defining with respect to the overhead support member an angle of less than 90°, and with the partition element defining with a spaced apart partition element of an adjacent bail element an animal accommodating location, and a mounting means being provided for selectively mounting the partition element in one of a first orientation and a second orientation extending in respective directions relative to the overhead support member and defining with respect to the overhead support member respective ones of the angle of less than 90°, so that in the first orientation of the partition element the bail apparatus is adapted for receiving animals from a first direction parallel to the overhead support member, and in the second orientation of the partition element the bail apparatus is adapted for receiving the animals from a second direction parallel to the overhead support member and opposite to the first direction.

Preferably, the mounting means is located on one of the coupling means and the partition element and defines a first abutment face and a second abutment face extending at an angle to each other for selectively abutting a corresponding engagement face defined by the other of the coupling means and the partition element, the first abutment face of the mounting means being adapted for mounting the partition element in the first orientation, and the second abutment face being adapted for mounting the partition element in the second orientation.

Advantageously, the first abutment face defined by the mounting means is adapted to extend at an angle relative to the overhead support member such that a normal to the first abutment face defines an angle with respect to the overhead support member similar to that at which the partition element extends with respect to the overhead support member in the first orientation.

Ideally, the second abutment face defined by the mounting means is adapted to extend at an angle relative to the overhead support member such that a normal to the second abutment face defines an angle with respect to the overhead support member similar to that at which the partition element extends with respect to the overhead support member in the second orientation.

In one embodiment of the invention the first and second abutment faces defined by the mounting means define an excluded angle greater than 180° and less than 260°. Preferably, the first and second abutment faces defined by the mounting means define an excluded angle in the range of 190° to 240°. Advantageously, the first and second abutment faces defined by the mounting means define an excluded angle in the range of 200° to 230°. Ideally, the first and second abutment faces defined by the mounting means define an excluded angle of approximately 203°.

In another embodiment of the invention the mounting means is provided on the coupling means.

Preferably, the engagement face is defined by the partition element and extends substantially transversely of a plane defined by the partition element.

In a further embodiment of the invention the mounting means comprises an elongated mounting plate member bent along a longitudinally extending bend axis and defining the first abutment face on one side of the bend axis and the second abutment face on the other side of the bend axis.

In a still further embodiment of the invention the partition element comprises a forward part and a rearward part, and the mounting plate member defines respective front and rear major surfaces, the front major surface defining forward first and second abutment faces for abutting a corresponding forward engagement face associated with the forward part of the partition element with the forward part of the partition element in the respective ones of the first and second orientations, and the second major surface of the coupling plate member defining rearward first and second abutment faces for abutting a corresponding rearward engagement face associated with the rearward part of the partition element with the rearward part of the partition element in the respective ones of the first and second orientations.

Advantageously, the forward part of the partition element defines the forward engagement face for abutting the selected one of the forward first and second abutment faces, and the rearward part of the partition element defines the rearward engagement face for abutting the selected one of the rearward first and second abutment faces.

Preferably, the forward part of the partition element comprises a forward engagement plate defining the forward engagement face of the forward part of the partition element for abutting the selected one of the forward first and second abutment faces of the mounting plate member. Advantageously, the forward part of the partition element comprises an upper member and a spaced apart lower member extending forwardly from the forward engagement plate.

Preferably, the rearward part of the partition element comprises a rearward engagement plate defining the rearward engagement face of the rearward part of the partition element for abutting the selected one of the rearward first and second abutment faces of the mounting plate member. Advantageously, the rearward part of the partition element comprises an upper member and a spaced apart lower member extending rearwardly from the rearward engagement plate.

In one embodiment of the invention a central framework is coupled to the coupling means, a portion of which central framework defines with a portion of a central framework of an adjacent bail element a crush in the animal accommodating location defined with the said adjacent bail element for permitting access to the head and neck of an animal to a rearward portion of the animal accommodating location defined between the rearward part of the partition element and a spaced apart rearward part of a partition element of the adjacent bail element.

Advantageously, a bracing element extends between the forward part of the partition element and the central framework for stabilising the partition element in the selected one of the first and second orientations.

Preferably, the central framework defines a substantially vertically extending plane which contains the overhead support member.

Advantageously, the coupling means is adapted for coupling the bail element to the overhead support member with the partition element defining a substantially vertical plane in each of the respective first and second orientations.

In one embodiment of the invention the vertical planes defined by the partition element in the respective first and second orientations defines with a vertical plane containing the overhead support member the corresponding angle of less than 90°.

In another embodiment of the invention the angle defined by the vertical planes defined by the partition element in the respective first and second orientations and the vertical plane containing the overhead support member is less than 90° and greater than 50°. Preferably, the angle defined by the vertical planes defined by the partition element in the respective first and second orientations and the vertical plane containing the overhead support member lies in the range of 60° to 85°. Advantageously, the angle defined by the vertical planes defined by the partition element in the respective first and second orientations and the vertical plane containing the overhead support member lies in the range of 75° to 80°. Ideally, the angle defined by the vertical planes defined by the partition element in the respective first and second orientations and the vertical plane containing the overhead support member is approximately 78.5°.

In another embodiment of the invention the coupling means comprises a coupling bracket, and the mounting means extends downwardly therefrom.

Preferably, a fastening means is provided for securing the partition element to the mounting means.

In one embodiment of the invention a closure means is pivotally coupled to the partition element about a pivot axis for selectively closing the adjacent upstream animal accommodating location defined between the partition element and a spaced apart partition element of an adjacent bail element located to the upstream side of the bail element. Preferably, the closure means is operable from a closed state closing the adjacent upstream animal accommodating location and an open state providing access to the adjacent upstream animal accommodating location in response to an animal entering an animal accommodating location defined between the partition element and a spaced apart partition element of an adjacent downstream bail element. Advantageously, the closure means is releasably securable to the partition element.

In another embodiment of the invention the closure means is adapted for securing to the partition element in one of a first orientation extending to one side of the partition element, and in a second orientation extending to the other side of the partition element for accommodating the partition element in the respective ones of the first and second orientations.

Preferably, the closure means terminates at one end in a portion which projects beyond the pivot axis thereof for engaging an animal entering the animal accommodating location defined between the partition element and a spaced apart partition element of an adjacent downstream bail element. Advantageously, the closure means is biased into the closed state. Ideally, the closure means is spring urged into the closed state.

The invention also provides bail apparatus for separating animals, the bail apparatus comprising an elongated longitudinally extending overhead support member, and a plurality of bail elements according to the invention secured to the overhead support member at spaced apart intervals along the overhead support member by the respective coupling means, the partition elements of the bail elements extending from the overhead support member and defining respective vertical planes, the vertical planes of the respective partition elements defining with a vertical plane containing the overhead support member respective angles of less than 90°, and the partition elements of adjacent bail elements defining respective animal accommodating locations.

Further the invention provides bail apparatus for separating animals, the bail apparatus comprising an elongated longitudinally extending overhead support member and a plurality of bail elements coupled to the overhead support member at spaced apart intervals along the overhead support member and extending substantially transversely of the overhead support member, each bail element comprising a partition element, and a coupling means adapted for coupling the bail element to the overhead support member with the bail element depending downwardly therefrom and with the partition element extending substantially transversely relative to the overhead support member and defining with respect to the overhead support member an angle of less than 90°, and with the partition element defining with a spaced apart partition element of an adjacent bail element an animal accommodating location, and a mounting means being provided on each bail element for selectively mounting the partition element thereof in one of a first orientation and a second orientation extending in respective directions relative to the overhead support member and defining with respect to the overhead support member respective ones of the angle of less than 90°, so that in the first orientation of the partition elements the bail apparatus is adapted for receiving animals from a first direction parallel to the overhead support member, and in the second orientation of the partition elements the bail apparatus is adapted for receiving the animals from a second direction parallel to the overhead support member and opposite to the first direction.

Additionally the invention provides a method for providing bail apparatus of the type for separating animals, the method comprising providing an elongated overhead support member, providing a plurality of bail elements comprising respective partition elements and respective coupling means adapted for coupling corresponding ones of the bail elements to the overhead support member with the bail elements depending downwardly therefrom and with the partition elements extending substantially transversely of the overhead support member and defining with a spaced apart partition element of an adjacent one of the bail elements an animal accommodating location, providing the bail elements with respective mounting means for selectively mounting corresponding ones of the partition elements in one of a first orientation and a second orientation extending in respective different directions at respective angles, each of less than 90° relative to the overhead support member so that in the first orientation of the partition elements the bail apparatus is adapted for receiving animals from a first direction parallel to the overhead support member, and in the second orientation of the partition elements the bail apparatus is adapted for receiving the animals from a second direction parallel to the overhead support member and opposite to the first direction.

Preferably, the method further comprises coupling the coupling means to the overhead support member at spaced apart locations therealong, and mounting the partition elements by the mounting means in a selected one of the first and second orientations.

The advantages of the invention are many. A particularly important advantage of the invention is that the bail apparatus according to the invention and the bail elements are particularly suitable for supplying in knocked-down form, which is easily transportable and is suitable for ready and easy assembly on site. Indeed, the bail apparatus and the bail elements are particularly suitable for supplying in knocked-down form in flat-pack type configuration. Furthermore, by virtue of the fact that the bail apparatus can be supplied in knocked-down form and in flat-pack configuration, transportation costs of the bail apparatus and the bail elements is minimised.

Additionally, by virtue of the fact that the bail elements are provided with the coupling means and the mounting means, the bail apparatus and the bail elements may be assembled on site with the partition elements in either one of the selectable first and second orientations. Thus, stocking requirements of the bail apparatus and the bail elements is minimised, thereby significantly reducing overhead stocking costs. Additionally, preparation and the selection of stock for shipment is significantly simplified, since the same bail apparatus and bail elements may be shipped irrespective of whether the partition elements of the bail elements are to be mounted relative to the overhead support member in the first or second orientation.

Figure 4:
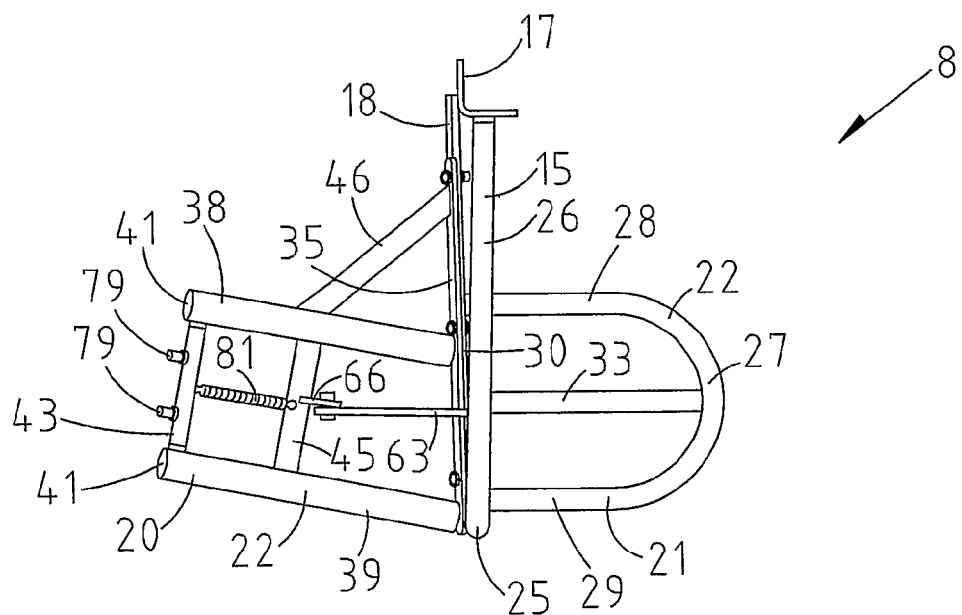
Figure 5:
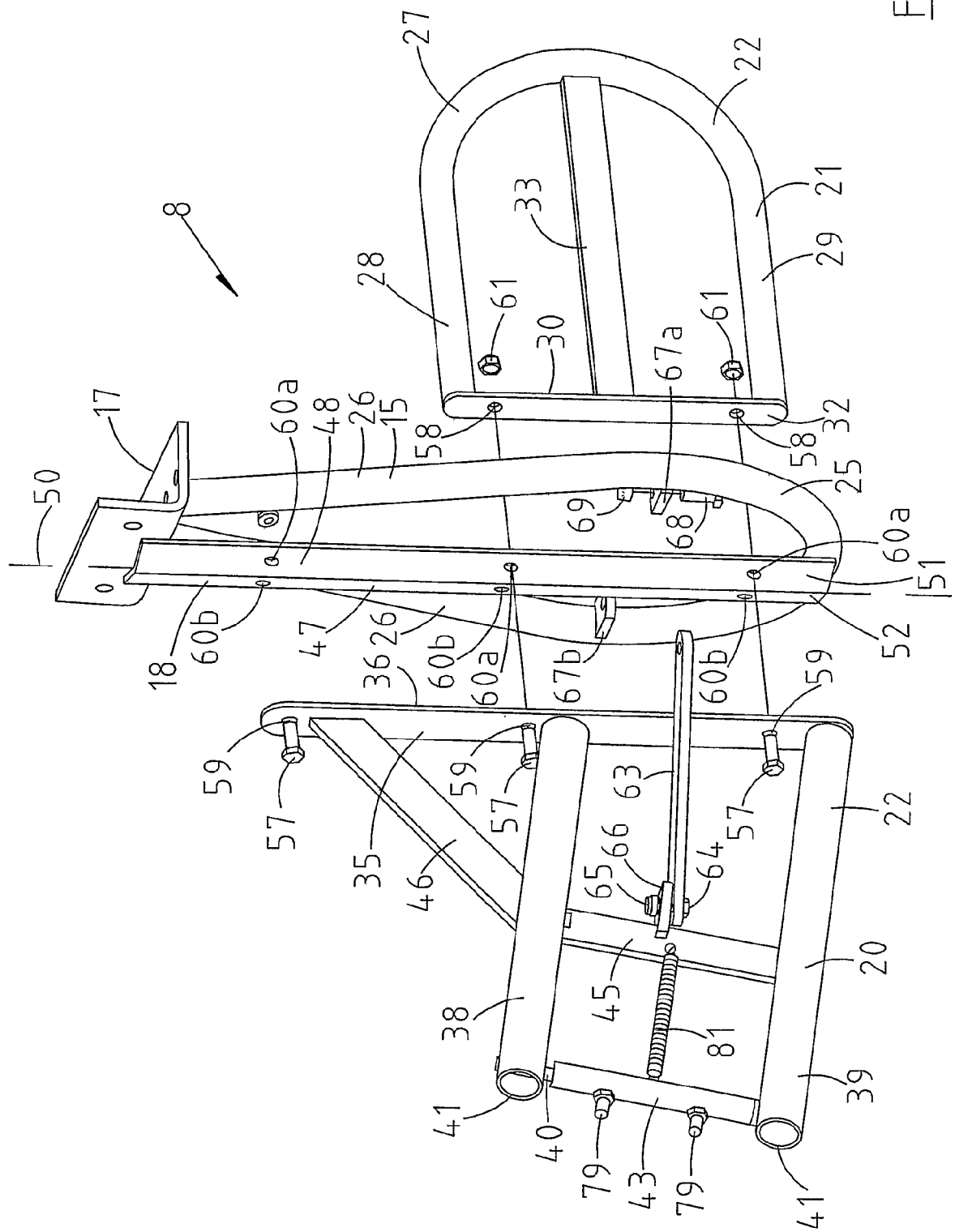
Figure 6:
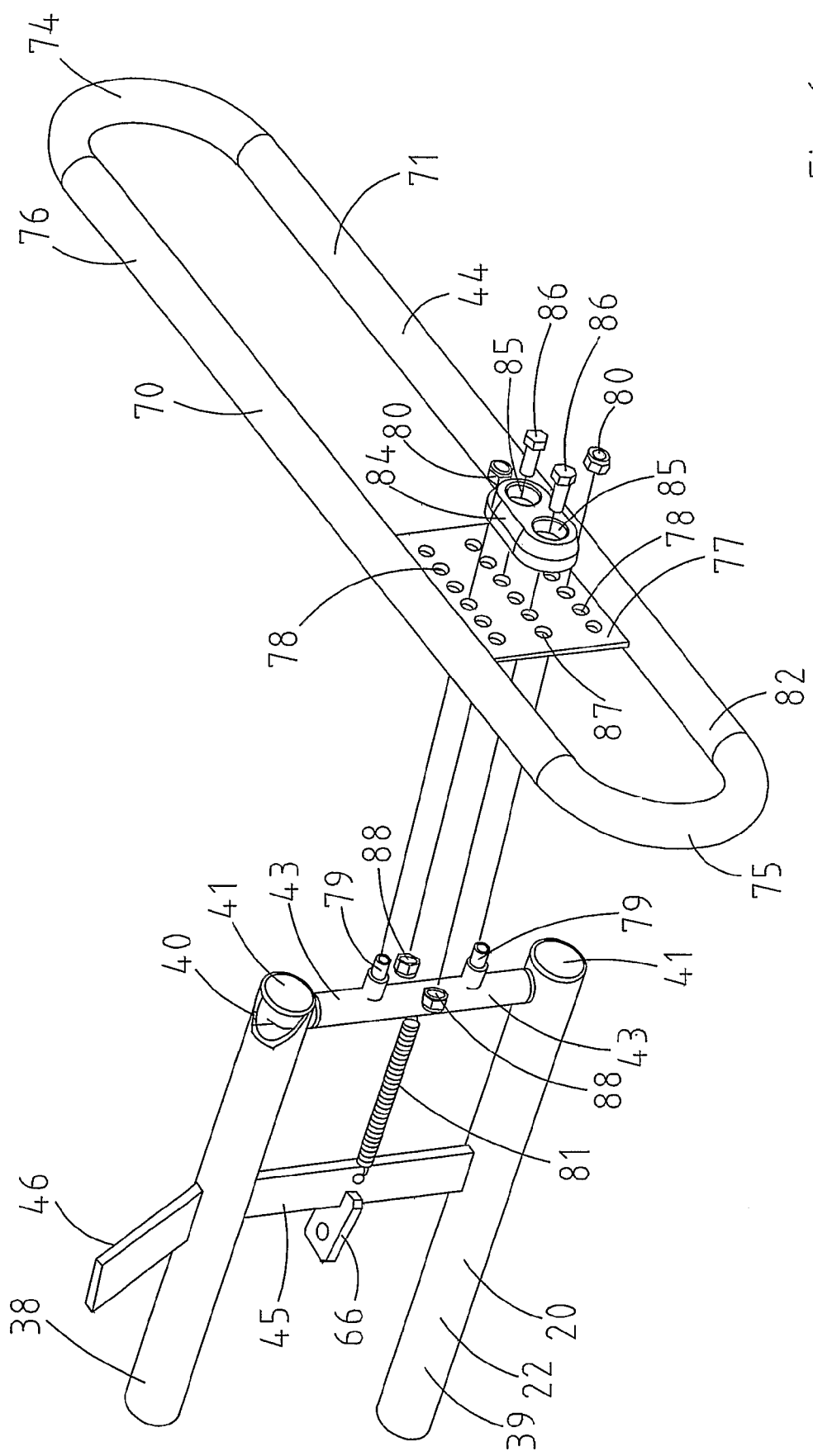

The invention will be more clearly understood from the following description of a preferred embodiment thereof, which is given by way of example only, with reference to the accompanying drawings, in which:

FIG. 1 is an end elevational view of two bail apparatus according to the invention, FIG. 2 is a side elevational view of one of the bail apparatus of FIG. 1, FIG. 3 is a top plan view of one of the bail apparatus of FIG. 1, FIG. 4 is a side elevational view of a bail element also according to the invention of the bail apparatus of FIG. 1 with a portion of the bail element removed, FIG. 5 is an exploded perspective view of the bail element of FIG. 4, FIG. 6 is an exploded perspective view of a detail of the bail element of FIG. 4 illustrating the portion which is omitted in FIGS. 4 and 5, FIG. 7 is a top plan view of a detail of the bail element of FIG. 4, FIG. 8 is a top plan view of a further detail of the bail element of FIG. 4, and FIG. 9 is a view similar to FIG. 8 illustrating the detail of FIG. 8 in a different configuration.

Referring to the drawings, there is illustrated bail apparatus according to the invention, indicated generally by the reference numeral 1, for separating animals. The bail apparatus 1 according to this embodiment of the invention is particularly suitable for use in a milking parlour 2 for separating cows during milking. Two bail apparatuses 1 are illustrated in FIG. 1, one of which on the left-hand side of FIG. 1 is illustrated in a lower operative state for separating animals, and the other on the right-hand side of FIG. 1 is illustrated in an upper release state for releasing the animals on completion of milking.

Each bail apparatus 1 is particularly suitable for supplying in a knocked-down state in flat-pack kit form ready for assembly in the milking parlour 2, and comprises an elongated longitudinally overhead support member 3 which extends in use longitudinally along the milking parlour 2 in a general direction from an upstream end 5 to a downstream end 6. A plurality of bail elements 8 also according to the invention are secured to the overhead support member 3 of each bail apparatus at spaced apart intervals along the overhead support member 3, and extend downwardly therefrom, so that adjacent ones of the bail elements 8 define animal accommodating locations 10 therebetween.

The overhead support member 3 of each bail apparatus 1 is suspended on a linkage mechanism 11 from a corresponding longitudinally extending operating member 12 which is rotatably mounted on an overhead support framework 14. Rotation of the operating member 12 of each bail apparatus 1 in the direction of the arrow A lowers the corresponding overhead support member 3 and in turn the bail elements 8 secured thereto into the lower operative state, and rotation of the operating member 6 of each bail apparatus 1 in the opposite direction, namely, in the direction of the arrow B raises the corresponding overhead support member 3 and the bail elements 8 secured thereto into the upper release state. The operation of bail apparatus between a lower operative state and an upper release state is described in Irish Patent Specification No. 84172 and the corresponding British Patent Specification No. 2,386,815.

A passageway 16 extends along each bail apparatus 1 between the bail apparatus 1 and a corresponding railing 19 extending longitudinally and parallel to the overhead support member 3 from the upstream end 5 to the downstream end 6 and spaced apart from the bail apparatus 1. The passageway 16 accommodates animals in single file along the bail apparatus 1 from the upstream end 5 to the downstream end 6 so that, as will be described in detail below, the animals sequentially occupy the animal accommodating locations 10 defined by the bail elements 8 from the downstream end 6 of the bail apparatus 1 to the upstream end 5 thereof.

Each bail element 8 comprises a central framework 15 which is secured to the corresponding overhead support member 3 by a coupling means, namely, a coupling bracket 17 of stainless steel. A mounting means comprising a mounting plate member 18 of stainless steel secured to and extending downwardly from the coupling bracket 17 facilitates selective coupling of a forward part 20 and a rearward part 21 of a partition element 22 of the bail element 8 in one of two selectable orientations, namely, a first orientation with the partition element 22 extending transversely relative to the overhead support member 3 at an angle α in one direction when viewed in plan, as illustrated in full lines in FIG. 3, and a second orientation with the partition element 22 extending transversely relative to the overhead support member 3 at an angle α' in a different direction when viewed in plan as illustrated in broken lines in FIG. 3. In this embodiment of the invention the angles α and α' are of similar value as will be described below. By mounting the partition elements 22 in the first orientation relative to the overhead support member 3 illustrated in full lines in FIG. 3, the bail apparatus 1 is suitable for receiving animals from the upstream end 5, as the animals move in single file along the passageway 16 in the direction of the arrows C from the upstream end 5 to the downstream end 6, and by mounting the partition elements 22 in the second orientation relative to the overhead support member 3, one of which bail elements 22 is illustrated in broken lines in FIG. 3 in the second orientation, the bail apparatus 1 is suitable for receiving animals from the downstream end 6, as the animals move in single file along the passageway 16 in the opposite direction to that of the arrow C from the downstream end 6 to the upstream end 5, as will be described in more detail below.

The central framework 15 of each bail element 8 is constructed of a single length of tubular stainless steel, which is bent to form a lower arcuate portion 25 and a pair of converging side members 26 extending upwardly from the arcuate portion 25 to the coupling bracket 17. The side members 26 are welded to the coupling bracket 17. The mounting plate member 18 extends downwardly from the coupling bracket 17 to the lower arcuate portion 25 of the central framework 15, and is welded to both the coupling bracket 17 and the lower arcuate portion 25.

Before describing the mounting plate 18 of each bail element 8 in further detail, the forward and rearward parts 20 and 21 of the partition elements 22 will first be described. The rearward part 21 of each partition element 22 is formed by a length of tubular stainless steel which is bent to form a rearward arcuate portion 27 and a pair of spaced apart upper and lower side members 28 and 29, respectively, which extend from the rearward arcuate part 27 to a rearward engagement plate member 30 also of flat stock stainless steel, which defines a forwardly facing rearward engagement face 32 for engaging the corresponding mounting plate member 18 for securing the rearward part 21 of the partition element 22 to the mounting plate member 18 in a selected one of the first and second selectable orientations as will be described below. The rearward engagement face 32 defined by the rearward engagement plate member 30 of each partition element 22 extends at an angle of 90° to a vertical plane defined by the partition element 22. An intermediate member 33 of flat stock stainless steel extends between the rearward arcuate member 27 and the rearward engagement plate member 30 parallel to and spaced apart from the upper and lower side members 28 and 29.

The forward part 20 of each partition element 22 comprises a forward engagement plate member 35 of flat stock stainless steel which defines a rearwardly facing forward engagement face 36 for engaging the corresponding mounting plate member 18 for securing the rearward part 20 of the partition element 22 to the mounting plate member 18 in a selected one of the first and second selectable orientations as will also be described below. The forward engagement face 36 defined by the forward engagement plate member 35 of each partition element 22 extends at an angle of 90° to a vertical plane defined by the partition element 22. A pair of spaced apart tubular stainless steel top and bottom side members 38 and 39, respectively, extend from the forward engagement plate member 35 to form the forward partition 20. A pivot mounting bar 40 also of stainless steel extends between the top and bottom side members 38 and 39 at their respective distal ends 41 for pivotally carrying a tubular pivot member 43 of stainless steel for pivotally carrying a corresponding closure means, namely, a gate 44 as will be described below. An intermediate strut 45 of flat stock stainless steel extending between the top and bottom side members 38 and 39 and welded thereto reinforces the forward part 20 of the partition element 22. A strengthening strut 46 also of flat stock stainless steel extends obliquely from the top side member 38 to the forward engagement plate member 35 for strengthening the forward part 20 of the partition element 22.

Returning now to the mounting plates 18, the mounting plate 18 of each bail element defines a front major surface 47 and a rear major surface 48 and is bent along a longitudinally extending bend axis 50. The bend axis 50 defines on the front major surface 47 a first forward abutment face 51 and a second forward abutment face 52 for engaging the forward engagement face 36 of the forward engagement plate member 35 of the forward part 20 of the corresponding partition element 22 with the partition element 22 in a selected one of the selectable first and second orientations. The bend axis 50 defines on the rear major surface 48 of the corresponding mounting plate member 18 first and second rearward abutment faces 55 and 56 respectively, for engaging the rearward engagement face 32 of the rearward engagement plate member 30 of the rearward portion 21 of the corresponding partition element 22 with the partition element 22 in one of the first and second selectable orientations.

When the forward engagement face 36 of the forward engagement plate member 35 of the forward part 20 of the partition element 22 is in abutting engagement with the first forward abutment face 51 of the mounting plate member 18, and when the rearward engagement face 32 of the rearward engagement plate member 30 of the rearward part 21 of the partition element 22 is in abutting engagement with the first rearward abutment face 55 of the mounting plate member 18, the partition element 22 is in the first orientation. When the first engagement face 36 of the forward engagement plate member 35 of the forward part 20 of the partition element 22 is in abutting engagement with the second forward abutment face 52 of the mounting plate member 18, and the rearward engagement face 32 of the rearward engagement plate member 30 of the rearward part 21 of the partition element 22 is in abutting engagement with the second rearward abutment face 56 of the mounting plate member 18, the partition element 22 is in the second orientation. In FIG. 8 the partition element 22 is illustrated mounted to the mounting plate member 18 in the first orientation, and in FIG. 9 the partition element 22 is illustrated mounted to the mounting plate member 18 in the second orientation.

In this embodiment of the invention the first and second forward abutment faces 51 and 52 define an external angle θ of approximately 203°, while the first and second rearward abutment faces 55 and 56 define an internal angle φ of approximately 157°. Accordingly, when the coupling brackets 17 are secured to the overhead support member 3 of each bail apparatus 1, the partition elements 22 may be secured to the mounting plate 18 in either one of the first and second orientations, with the partition elements 22 defining respective vertical planes, which in turn define with a vertical plane containing the overhead support member 3 the angle α of approximately 78.5°. As discussed above, the one of the first and second orientations to which the partition elements 22 are secured to the corresponding mounting plate members 18 is selected depending on the direction from which the bail apparatus 1 is to be entered by the animals. In other words, where the animals are to enter the bail apparatus along the passageway 16 in the direction of the arrow C from the upstream end 5 to the downstream end 6 as illustrated in FIG. 3, the bail elements 8 are secured to the overhead support member 3 with the partition elements 22 secured to the corresponding mounting plate members 18 in the first orientation. However, if the animals were to enter along the passageway 16 in the opposite direction to the direction of the arrow C, then the partition elements 22 would be secured to the corresponding mounting plate members 18 in the second orientation.

Fastening means comprising three screws 57 of stainless steel engage holes 58 and 59 in the rearward engagement plate member 30 and the forward engagement plate member 35 and selected ones of holes 60a and 60b in the mounting plate member 18 for securing the forward and rearward parts 20 and 21, respectively, of the partition element 22 to the mounting plate member 18 in the selected one of the first and second orientations. Nuts 61 with the screws 57 secure the forward and rearward parts 20 and 21 of the partition element 22 to the mounting plate member 18 with the partition element 22 in the selected one of the first and second orientations.

A bracing strut 63 of stainless steel secured by a screw 64 and nuts 65 to a stainless steel bracket 66 welded to the intermediate strut 45 of the forward part 20 of each partition element 22 is selectably securable to a corresponding one of a pair of brackets 67a and 67b of stainless steel which are welded to the side members 26 of the central framework 15 adjacent the arcuate portion 25 for stabilising the partition element 22 relative to the central framework 15 in the selected one of the first and second orientations. A screw 68 and a nut 69 are provided for securing the bracing strut 63 to the selected one of the brackets 67a and 67b. When the partition element 22 is in the first orientation, the bracing strut 63 is secured to the bracket 67a, and when the partition element 22 is in the second orientation, the bracing strut 63 is secured to the bracket 67b.

The gate 44 of each bail element 8 comprises an upper member 70 and a lower spaced apart member 71, both of tubular stainless steel material extending between an outer arcuate end member 74 and an inner arcuate end member 75, both of tubular stainless steel material. A plate member 77 of stainless steel material welded to and extending between the upper and lower members 70 and 71 is provided for securing the gate 42 to the pivot member 43. The gate 44 is secured to the pivot member 43 by the plate member 77 and is pivotal on the pivot mounting bar 40 between a closed state closing the next upstream animal accommodating location 10 defined between the partition element 22 to which the gate 44 is secured and the partition element 22 of the next adjacent upstream bail element 8, and an open state extending outwardly from the partition element 22 and blocking the passageway 16 to prevent the passage of animals in a downstream direction beyond the gate 44.

The plate member 77 is located intermediate the outer and inner end members 74 and 75, but is located closer to the inner end member 75 than to the outer end member 74. The portion of the gate 44 between the plate member 77 and the outer end member 74 essentially forms the closure part 76 of the gate 44 which closes the upstream animal accommodating location 10 which is defined by the partition element 22 to which the gate 44 is pivotally coupled and the partition element 22 of the next adjacent upstream bail element 8. The plate member 77 is provided with a plurality of holes 78 for engaging corresponding screws 79 extending from the pivot member 43 which is pivotal on the pivot mounting member 40 for securing the gate 44 to the pivot member 43. Nuts 80 secure the plate member 77 to the screws 79. A tension spring 81 acting between the pivot member 43 and the intermediate strut 45 acts on the pivot member 43 of each bail element 8 for urging the corresponding gate 44 into the closed state.

An appropriate pair of the holes 78 are selected for securing the plate member 77 to the pivot member 43, so that the portion of the gate 44 between the pivot member 43 and the outer end member 74 forms the closure part 76 of the gate 44 for closing the next adjacent upstream animal accommodating location 10 formed between the partition element 22 to which the gate 44 is pivotally coupled and the partition element 22 of the next adjacent upstream bail element 8, and also to ensure that the gate 44 overlaps the gate of the next adjacent upstream bail element 8, as will be described below.

Additionally, the appropriate pair of holes 78 in the plate member 77 are selected so that an abutment portion 82 of the gate 44 extends in a generally downstream direction from the pivot member 43 when the gate 44 is in the closed state for engaging an animal entering the animal accommodating location 10 defined between the partition element 22 to which the gate 44 is secured and the partition element 22 of the next adjacent downstream bail element 8, so that as the animal enters the animal accommodating location 10 between the partition element 22 to which the gate 44 is secured and the partition element 22 of the next adjacent downstream bail element 8, the animal acts on the abutment portion 82 of the gate 44 for urging the gate 44 into the open state against the action of the spring 81 for providing access to the upstream animal accommodating location 10 defined between the partition element 22 to which the gate 44 is attached and the partition element 22 of the next adjacent upstream bail element 8. Since in the open state the gate 44 acts to close the passageway 16, the next following animal in the passageway 16 from the upstream direction is directed into the animal accommodating location 10 between the partition element 22 to which the gate 44 is secured and the partition element 22 of the next adjacent upstream bail element 8.

In this embodiment of the invention provision is made for selecting the spacing between adjacent bail elements 8, and this is achieved by selecting the locations along the overhead support member 3 at which the coupling brackets 17 of the bail elements 8 are secured to the overhead support member 3. An appropriate pair of the holes 78 in the plate member 77 are selected for securing the gate 44 to the pivot member 43 of the corresponding partition element 22, depending on the spacing between the bail elements 8, so that the outer end member 74 of the gate 44 overlaps the gate 44 of the next adjacent upstream bail element. It is important that the holes 78 in the plate member 77 for engaging the screws 79 are selected so that the outer end member 74 of the gate 44 overlaps the gate 44 of the next adjacent upstream bail element 8 beyond the connection of that gate 44 to the pivot member 43, in order to avoid the outer end member 74 of the gate 44 bearing on the portion 82 of the gate 44 of the next adjacent upstream bail element 8, which would cause the gate of the next adjacent upstream bail element 8 to be urged into the open state.

A cushioning abutment member 84 is secured to the plate member 77 of each gate 44 for abutting the outer end member 74 of the gate 44 of the next adjacent downstream bail element 8 for minimising the noise of impact of the gate members with their next upstream adjacent gate members as the gate members are being urged into the closed state by the spring 81 when the corresponding bail apparatus 1 is being raised from the lower operative state to the upper release state. The cushioning abutment members 84 are of a resilient rubber or rubber substitute material, and each comprises a pair of countersunk bores 85 for accommodating screws 86 into corresponding holes 87 in the plate member 77 of the corresponding gate 44. The appropriate pair of holes 87 are selected so that the cushioning abutment member 84 is aligned with the outer end member 74 of the gate 44 of the next adjacent downstream bail element 8. Nuts 88 engage the screws 86 for securing the cushioning abutment members 84 to the plate members 77 of the corresponding gates 44.

Each central framework 15 defines with the central framework 15 of the adjacent bail elements 8 a crush which accommodates only an animal's head and neck beyond the crush into a rear portion 90 of the corresponding animal accommodating location 10. The rear portion of each animal accommodating location 10 is defined by the crush and the corresponding rearward parts 21 of the partition elements 22 of the adjacent bail elements. The forward parts 20 of the partition elements 22 of adjacent bail elements 8 define with the corresponding crushes forward portions of the corresponding animal accommodating locations 10 for accommodating the body of the animal. Typically, animal feed is provided in the rear portion 10 of each animal accommodating location 10 for feeding the animals during milking.

In use, each bail apparatus 1 is supplied in a knocked-down state in kit form ready for assembly on site with the bail elements disassembled from the overhead support member 3, and the forward and rearward parts 20 and 21 of the partition elements 22 disassembled from the corresponding mounting plates 18. Additionally, the overhead support member 3 is disassembled from the linkage mechanism 11 and from the operating member 12. When received on site, the forward part 20 and the rearward part 21 of each bail element 8 is secured to the appropriate ones of the first and second forward and rearward abutment faces 51, 52, 55 and 56 of the mounting plate member 18, so that the forward and rearward parts 20 and 21 of the partition element 22 extend from the mounting plate member 18 in the appropriate one of the first and second orientations. The bracing struts 63 are then secured to the brackets 66 on the intermediate strut 45 of the forward parts 20 of the corresponding partition elements 22 and to the appropriate one of the brackets 67a and 67b on the corresponding central framework 15.

The bail elements 8 are then assembled to the overhead support member 3 so that the respective bail elements 8 are secured to the overhead support member 3 at the desired spacing along the overhead support member 3. Screws 93 and nuts 94, both of stainless steel, through holes 95 in the overhead support member 3 secure the coupling brackets 17 to the overhead support member 3. The gates 44 are then secured to the pivot members 43 by selecting the appropriate pair of holes 78 in the plate members 77 so that the gates 44 overlap each other as already described. The cushioning abutment members 84 are then secured to the mounting plates 77 of the gates 44 appropriately located for engaging the outer end members 74 of the adjacent downstream gates.

The overhead support framework 14 is mounted in the milking parlour 2 and the operating member 12 of each bail apparatus 1 is rotatably mounted thereon. The linkage mechanism 11 is secured to the operating member 12, and the overhead support member 3 with the assembled bail elements 8 secured thereto is secured to the linkage mechanism 11.

With the bail apparatus 1 appropriately assembled and secured to the overhead support framework 14, the bail apparatus 1 is ready for use. When in the lower operative state the bail apparatus 1 defines the passageway 16 extending parallel to the overhead support member 3, and is ready for use. Initially the overhead support member 3 is in the raised release state, with the gates 44 urged into the closed state by the springs 81. On lowering the overhead support member 3 into the operative state by rotating the operating member 12 in the direction of the arrow A, the bail elements 8 and the gates 44 define with the railing 19 the passageway 16. In this embodiment of the invention a downstream barrier 96 is also secured to the overhead support member 3, which when the overhead support member 3 is lowered into the lower operative state, the downstream barrier blocks the downstream end of the passageway 16, and also defines with the downstream-most bail element 8a a downstream-most animal accommodating location 10a.

Thus, as the animals proceed along the passageway 16 in the direction of the arrow C from the upstream end 5 to the downstream end 6 in single file, the leading animal proceeds along the passageway 16 until the animal can proceed no further due to the downstream barrier 96. On reaching the downstream barrier 96 the animal is directed into the downstream-most animal accommodating location 10a. On entering the downstream-most animal accommodating location 10a, the animal engages the abutment portion 82 of the gate 44 of the downstream-most bail element 8a, thereby urging the gate 44 against the action of the spring 81 into the open state. In the open state the gate 44 of the downstream-most bail element 8 blocks the passage 16 to the next following animal, which is thus directed by the gate 44 in the open state into the next upstream animal accommodating location 10b. On entering the animal accommodating location 10b, the animal engages the abutment portion 82 of the next adjacent upstream bail element 8b, thereby urging the gate 44 against the action of the spring 81 into the open state, which in turn blocks the passage of the next following animal along the passageway 16, which in turn is directed into the next upstream animal accommodating location 10c, and so on until all the animal accommodating locations 10 are sequentially occupied by respective animals from the downstream-most animal accommodating location 10a to the upstream-most animal accommodating location 10.

The animals on entering the animal accommodating locations 10 proceed into the animal accommodating locations 10 so that the bodies of the animals occupy the forward portion 91 of the animal accommodating locations 10 with the heads of the animal extending into the rearward portions 90 of the corresponding animal accommodating locations 10 for feeding therefrom. Milking of the animals is then carried out.

On completion of milking, the operating member 12 is rotated in the direction of the arrow B for raising the overhead support member 3 and in turn the bail elements 8 into the raised release state. As the abutment portions 82 of the gates 44 disengage the animals during raising of the overhead support member 3, the gates 44 are urged into the closed state by the action of the springs 81. When the overhead support member 3 has been raised into the overhead release state, the animals can merely walk in the direction of the arrows C to the downstream end 6 of the milking parlour 2 and exit therefrom. Additionally, with the bail apparatus 1 in the raised release state, the gates 44 are in the closed state, and the bail apparatus 1 is ready for lowering into the lower operative state to receive the next batch of animals for milking.

While the bail apparatus has been described as being of stainless steel material, it will be appreciated that the bail apparatus may be of any other suitable material, and may be of a mix of different materials, including, for example, a mix of stainless steel and plastics materials, or any other suitable materials.

While the partition elements of each bail element have been described as comprising forward and rearward parts which are essentially in the form of frameworks, the forward and rearward parts of the partition elements may be of any other suitable construction. Indeed, in certain cases, it is envisaged that the rearward parts of the partition elements may be dispensed with.

It will also be appreciated that other suitable closure means besides the gates as illustrated and described may be provided. Indeed, in certain cases, the closure means may be provided by a single bar.

Needless to say, the bail apparatus may be provided with any other suitable form of overhead support means, and any other suitable form of operating mechanisms for raising and lowering the bail apparatus between the lower operative state and the upper release state.

While the bail apparatus has been described as being suitable for separating cows during milking, the apparatus may be used for separating cows or cattle during feeding only, and furthermore, it will be readily apparent to those skilled in the art that the bail apparatus may be used for separating any type of animals besides cattle, for example, sheep, pigs, goats, deer, and indeed, the bail apparatus may be used for separating poultry and other such fowl or animals. Needless to say, where the bail apparatus is to be used for separating other types of animals or fowl, the bail apparatus will be appropriately sized to suit the animals or fowl to be separated.

While the partition elements have been described as extending relative to the overhead support member at an angle of 78.5°, it will be appreciated that the angle at which the partition elements extend relative to the overhead support member may be other than 78.5°. Indeed, it is envisaged that the angle at which the partition elements extend relative to the overhead support member may lie in the range of 50° to just less than 90°, although preferably, it is envisaged that the partition elements should extend relative to the overhead support member at an angle in the range of 60° to 85°, and more preferably, it is envisaged that the partition elements should extend relative to the overhead support member at an angle in the range of 75° to 80°.

While the bail apparatus has been described as being raised and lowered between the operative state and the release state by rotating the operating shaft, it is envisaged in many cases that one or more hydraulic rams may be provided for urging the bail apparatus upwardly and downwardly between the operative state and the release state. Such one or more hydraulic rams may be arranged to act between the bail element and any other suitable fixed anchorage point, for example, the ground, or the main support framework. It is also envisaged that one or more hydraulic rams may be provided for rotating the operating member.

Indeed, it is envisaged that where the apparatus is raised and lowered by one or, more hydraulic rams acting between the bail apparatus and a fixed point, for example, the ground, it is envisaged that the linkage mechanism between the bail element and the operating member may be provided solely for the purpose of controlling and guiding the upward and downward movement of the bail apparatus.

The invention claimed is:

1. A bail element for bail apparatus, the bail apparatus being of the type for separating animals and comprising an elongated longitudinally extending overhead support member, the bail element comprising
   a partition element,
   a coupling means adapted for coupling the bail element to the overhead support member with the bail element depending downwardly therefrom and with the partition element extending substantially transversely relative to the overhead support member and defining with respect to the overhead support member an angle of less than 90°, and with the partition element defining with a spaced apart partition element of an adjacent bail element an animal accommodating location, and
   a mounting means being provided for selectively mounting the partition element in one of a first orientation and a second orientation extending in respective directions relative to the overhead support member and defining with respect to the overhead support member respective ones of the angle of less than 90°, so that in the first orientation of the partition element the bail apparatus is adapted for receiving animals from a first direction parallel to the overhead support member, and in the second orientation of the partition element the bail apparatus is adapted for receiving the animals from a second direction parallel to the overhead support member and opposite to the first direction.

2. A bail element as claimed in claim 1 in which the mounting means is located on one of the coupling means and the partition element and defines a first abutment face and a second abutment face extending at an angle to each other for selectively abutting a corresponding engagement face defined by the other of the coupling means and the partition element, the first abutment face of the mounting means being adapted for mounting the partition element in the first orientation, and the second abutment face being adapted for mounting the partition element in the second orientation.

3. A bail element as claimed in claim 2 in which the first abutment face defined by the mounting means is adapted to extend at an angle relative to the overhead support member such that a normal to the first abutment face defines an angle with respect to the overhead support member similar to that at which the partition element extends with respect to the overhead support member in the first orientation, and the second abutment face defined by the mounting means is adapted to extend at an angle relative to the overhead support member such that a normal to the second abutment face defines an angle with respect to the overhead support member similar to that at which the partition element extends with respect to the overhead support member in the second orientation.

4. A bail element as claimed in claim 2 in which the first and second abutment faces defined by the mounting means define an excluded angle greater than 180° and less than 260°.

5. A bail element as claimed in claim 4 in which the first and second abutment faces defined by the mounting means define an excluded angle in the range of 200° to 230°.

6. A bail element as claimed in claim 5 in which the first and second abutment faces defined by the mounting means define an excluded angle of approximately 203°.

7. A bail element as claimed in claim 2 in which the mounting means is provided on the coupling means.

8. A bail element as claimed in claim 7 in which the engagement face is defined by the partition element and extends substantially transversely of a plane defined by the partition element.

9. A bail element as claimed in claims 2 in which the mounting means comprises an elongated mounting plate member bent along a longitudinally extending bend axis and defining the first abutment face on one side of the bend axis and the second abutment face on the other side of the bend axis.

10. A bail element as claimed in claim 9 in which the partition element comprises a forward part and a rearward part, and the mounting plate member defines respective front and rear major surfaces, the front major surface defining forward ones of the first and second abutment faces for abutting a corresponding forward engagement face associated with the forward part of the partition element with the forward part of the partition element in the one of the respective first and second orientations, and the rear major surface of the coupling plate member defining rearward first and second abutment faces for abutting a corresponding rearward engagement face associated with the rearward part of the partition element with the rearward part of the partition element in the corresponding ones of the respective first and second orientations.

11. A bail element as claimed in claim 10 in which the forward part of the partition element defines the forward engagement face for abutting the selected one of the forward first and second abutment faces, and the rearward part of the partition element defines the rearward engagement face for abutting the selected one of the rearward first and second abutment faces.

12. A bail element as claimed in claim 11 in which the forward part of the partition element comprises a forward engagement plate defining the forward engagement face of the forward part of the partition element for abutting the selected one of the forward first and second abutment faces of the mounting plate member, and the rearward part of the partition element comprises a rearward engagement plate defining the rearward engagement face of the rearward part of the partition element for abutting the selected one of the rearward first and second abutment faces of the mounting plate member.

13. A bail element as claimed in claim 11 in which a central framework is coupled to the coupling means, a portion of which central framework defines with a portion of a central framework of an adjacent bail element a crush in the animal accommodating location defined with the said adjacent bail element for permitting access to the head and neck of an animal to a rearward portion of the animal accommodating location defined between the rearward part of the partition element and a spaced apart rearward part of a partition element of the adjacent bail element.

14. A bail element as claimed in claim 1 in which the coupling means is adapted for coupling the bail element to the overhead support member with the partition element defining a substantially vertical plane in each of the respective first and second orientations, the vertical planes defined by the partition element in the respective first and second orientations defining with a vertical plane containing the overhead support member the corresponding angle of less than 90°.

15. Bail apparatus for separating animals, the bail apparatus comprising
an elongated longitudinally extending overhead support member, and
a plurality of bail elements coupled to the overhead support member at spaced apart intervals along the overhead support member and extending substantially transversely of the overhead support member, each bail element comprising
a partition element,
a coupling means adapted for coupling the bail element to the overhead support member with the bail element depending downwardly therefrom and with the partition element extending substantially transversely relative to the overhead support member and defining with respect to the overhead support member an angle of less than 90°, and with the partition element defining with a spaced apart partition element of an adjacent bail element an animal accommodating location, and
a mounting means being provided on each bail element for selectively mounting the partition element thereof in one of a first orientation and a second orientation extending in respective directions relative to the overhead support member and defining with respect to the overhead support member respective ones of the angle of less than 90°, so that in the first orientation of the partition elements the bail apparatus is adapted for receiving animals from a first direction parallel to the overhead support member, and in the second orientation of the partition elements the bail apparatus is adapted for receiving the animals from a second direction parallel to the overhead support member and opposite to the first direction.

16. Bail apparatus as claimed in claim 15 in which the mounting means of each bail element is located on one of the coupling means and the partition element and defines a first abutment face and a second abutment face extending at an angle to each other for selectively abutting a corresponding engagement face defined by the other of the coupling means and the partition element, the first abutment face of the mounting means of each bail element being adapted for mounting the corresponding partition element in the first orientation, and the second abutment face of the mounting means of each bail element being adapted for mounting the corresponding partition element in the second orientation.

17. Bail apparatus as claimed in claim 16 in which the first abutment face defined by the mounting means of each bail element is adapted to extend at an angle relative to the overhead support member such that a normal to the first abutment face defines an angle with respect to the overhead support member similar to that at which the corresponding partition element extends with respect to the overhead support member in the first orientation.

18. Bail apparatus as claimed in claim 16 in which the second abutment face defined by the mounting means of each bail element is adapted to extend at an angle relative to the overhead support member such that a normal to the second abutment face defines an angle with respect to the overhead support member similar to that at which the corresponding partition element extends with respect to the overhead support member in the second orientation.

19. Bail apparatus as claimed in claim 16 in which the first and second abutment faces defined by the mounting means of each bail element define an excluded angle greater than 180° and less than 260°.

20. A method for providing bail apparatus of the type for separating animals, the method comprising providing an elongated overhead support member, providing a plurality of bail elements comprising respective partition elements and respective coupling means adapted for coupling corresponding ones of the bail elements to the overhead support member with the bail elements depending downwardly therefrom and with the partition elements extending substantially transversely of the overhead support member and defining with a spaced apart partition element of an adjacent one of the bail elements an animal accommodating location, providing the bail elements with respective mounting means for selectively mounting corresponding ones of the partition elements in one of a first orientation and a second orientation extending in respective different directions at respective angles, each of less than 90° relative to the overhead support member so that in the first orientation of the partition elements the bail apparatus is adapted for receiving animals from a first direction parallel to the overhead support member, and in the second orientation of the partition elements the bail apparatus is adapted for receiving the animals from a second direction parallel to the overhead support member and opposite to the first direction, and mounting the partition elements in a selected one of the first and second orientations.

\* \* \* \* \*